Patented Aug. 27, 1940

2,212,928

UNITED STATES PATENT OFFICE 2,212,928

PRODUCTION OF META-DIAZA COMPOUNDS

Erich Berthold and Werner Rohland, Ludwigshafen-on-the-Rhine, Germany, assignors to General Aniline & Film Corporation, a corporation of Delaware No Drawing. Application July 8, 1939, Serial No. 283,460. In Germany July 28, 1938

5 Claims. (Cl. 260—261)

The present invention relates to meta-diaza compounds and a process of producing same.

We have found that meta-diaza compounds (pyrimidines) can be obtained in an advantageous manner by causing ammonia and aldehydes to act on cyclic compounds having at least three condensed rings and the grouping

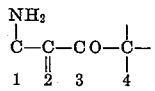

in which at least the carbon atoms 1 and 2 are members of rings.

Suitable initial materials are for example alpha-aminoanthraquinones which may contain any substituents or attached rings. From these there are usually obtained meta-diaza-benzanthrones (anthrapyrimidines). There are also suitable as initial materials cyclic ortho-aminoalkyl ketones or ortho-aminoaryl ketones, as for example 2-amino-3-acetyl- or -benzoyl-anthraquinones. In this case there are obtained anthraquinones to which the diaza ring is attached (pyrimidinoanthraquinones).

Instead of aminoanthraquinones there may also be used higher condensed ring systems which contain the above grouping, as for example 4- or 5-aminoanthrones to which is attached in the 1.9-position an isocyclic or heterocyclic ring, as for example 4- or 5-aminobenzanthrones, -azabenzanthrones, -anthrapyrimidones, -anthrapyridones, -anthrapyridazines, or -pyrazol- or -thiazolanthrones.

Other compounds containing at least three condensed rings and the above grouping, as for example 1-aminoacridones, -xanthones or -thioxanthones, may also be used as initial materials.

In many cases it is unnecessary to use the finished amino compounds. It is also possible to start for example from the nitro compounds and to convert these first into the amino compounds in the same working operation. The reduction of the nitro compounds may for example already be caused by the presence of the aldehyde and ammonia.

Suitable aldehydes are aldehydes of the aliphatic, cycloaliphatic, aromatic or heterocyclic series, as for example formaldehyde, acetaldehyde, benzaldehyde and its derivatives, aldehydes of high molecular compounds, as for example naphthaldehydes, anthraquinone-aldehydes, and also heterocyclic aldehydes, such as those of the furane or indole series.

With many amino compounds, as for example with 1-aminoanthraquinone-2-carboxylic acid, there may be separated in the course of the process an intermediate compound formed by the reaction of the amino compound with formaldehyde and which is then converted into the desired final product with ammonia. The ammonia may be used liquid or gaseous or in the form of readily decomposable addition compounds, as for example in the form of aldehyde-ammonia or hexamethylene tetramine.

The reaction may be carried out quite generally and produces the final products in good, usually excellent, yields and in a state of great purity. It is preferably carried out by heating the initial materials together. Generally speaking it is preferable to use a diluent. For this purpose there may be mentioned water, alcohols or other indifferent organic diluents, such as aromatic and hydroaromatic hydrocarbons, their nitro or halogen compounds, as for example nitrobenzene, chlorbenzenes, naphthalene or pyridine; an excess of the aldehyde used may also serve as diluent.

When starting from already formed amines, it is preferable in many cases to add oxidizing agents, as for example nitro compounds or their sulfonic acids, arsenic acid, cupric salts, ammonium vanadate, oxygen or air.

The diaza compounds (pyrimidines) obtained are in part dyestuffs, but may also be used as initial materials for the preparation of dyestuffs.

It has already been proposed to convert compounds having the said grouping into meta-diaza compounds by treatment with acid amides, or their acylation products by treatment with ammonia. Contrasted with the said process, the process according to this invention allows of obtaining meta-diaza compounds of practical importance by a method which is especially simple industrially.

The following examples will further illustrate the nature of this invention but the invention is not restricted to these examples. The parts are by weight.

Example 1

20 parts of 1-aminoanthraquinone, 300 parts of 30 per cent ammonia, 100 parts of 30 per cent formaldehyde and 15 parts of meta-nitrobenzene sulphonic acid sodium salt are heated at 100° C. until unchanged initial material can no longer be detected. After cooling, the product is filtered off by suction and washed with water. The reaction product consists of pure Bz1.Bz3-diazabenzanthrone and is identical with the product described in Example 1 of the German specification No. 597,341.

The corresponding Bz2-phenyl derivative is obtained in the same way with benzaldehyde.

Example 2

20 parts of 1-aminoanthraquinone, 300 parts of 30 per cent ammonia, 100 parts of 30 per cent formaldehyde solution and a saturated aqueous solution of 40 parts of copper sulphate are heated at from 105 to 115° C. until the initial material has completely reacted. After cooling the product is filtered off by suction and washed with water until neutral. The product is identical with that of Example 1.

Example 3

20 parts of 1-aminoanthraquinone, 250 parts of 30 per cent ammonia and 50 parts of 30 per cent formaldehyde solution are heated to 100° C. in a closed vessel until initial material can no longer be detected. The product is then filtered off by suction and washed. The residue may be purified by sublimation or recrystallization. It consists, according to its properties and analysis, of 2-methyl-Bz1.Bz3-diazabenzanthrone and is identical with the product obtainable according to Example 1 of the specification No. 429,187.

1.4-diaminoanthraquinones and 1.5-diaminoanthraquinones react in an analogous manner.

Example 4

50 parts of 1.4-diaminoanthraquinone, 600 parts of aqueous ammonia solution, 100 parts of 30 per cent formaldehyde solution and 30 parts of meta-nitrobenzene sulfonic acid sodium salt are heated at from 100 to 115° C. until unchanged initial material can no longer be detected. After cooling, the product is filtered off by suction and the residue washed out with water. The resulting 4-amino-Bz1-Bz3-diazabenzanthrone is practically pure. It is identical with the compound described in Example 2 of the said German specification No. 597,341.

If the reaction be carried out at higher temperature, a compound is formed which according to its properties is 3.5.8.10-tetra-1.2-benzopyrene.

Example 5

20 parts of 1.4-diaminoanthraquinone, 300 parts of 30 per cent ammonia, 40 parts of acetaldehyde and 20 parts of meta-nitrobenzene sulphonic acid sodium salt are heated at from 105 to 115° C. until initial material can no longer be detected. After cooling, the crude product is filtered off by suction, washed until neutral and dried. If necessary it may be obtained in an entirely pure form by sublimation, fractionation from sulfuric acid or recrystallization from organic solvents, such as nitrobenzene or pyridine. According to its properties it is 4-amino-Bz1-methyl-Bz1.Bz3-diazabenzanthrone. The color of the solution in concentrated sulfuric acid is yellow-red.

Example 6

20 parts of 1.5-diaminoanthraquinone, 600 parts of 30 per cent ammonia, 200 parts of 30 per cent formaldehyde solution and 30 parts of meta-nitrobenzene sulfonic acid sodium salt are heated at from 100 to 120° C. until unchanged initial material can no longer be detected. The whole is worked up as described in Example 5. The compound formed is 1.3.7.9-tetraza-perylene according to its properties and analysis.

The same compound is obtained by reacting 5-amino-Bz1.Bz3-diazabenzanthrone in the same way.

Example 7

20 parts of 1.2-diaminoanthraquinone, 300 parts of 30 per cent ammonia, 100 parts of 30 per cent formaldehyde solution and 30 parts of meta-nitrobenzene sulfonic acid sodium salt are heated at 110° C. until initial material can no longer be detected. After working up in the usual way there is obtained a compound which according to its properties is identical with the 2-amino-Bz1.Bz3-diazabenzanthrone described in Example 2 of the German specification No. 642,001.

From 1.3-diaminoanthraquinone there is obtained by working in an analogous manner 3 - amino - Bz1-Bz3 - diazabenzanthrone. From 1.8-diaminoanthraquinone, the corresponding 8-amino derivative is obtained. Other polyaminoanthraquinones, as for example 1.2.4-triaminoanthraquinone, 1.4.5-triaminoanthraquinone or 1.4.5.8-tetraminoanthraquinone, react in a similar manner.

Example 8

20 parts of 1.4-diamino-5-nitroanthraquinone, 300 parts of 30 per cent ammonia, 100 parts of 30 per cent formaldehyde solution and 30 parts of meta-nitrobenzene sulfonic acid sodium salt are heated at from 105 to 110° C. until initial material can no longer be detected.

After cooling, the residue is filtered off by suction and washed with water. The substance obtained is practically unitary and may be obtained in a pure form by recrystallization from organic solvents. According to analysis and its properties it consists of a 4-amino-x-nitro-Bz1.Bz3-diazabenzanthrone.

Example 9

20 parts of 1-amino-2-hydroxyanthraquinone, 200 parts of 30 per cent ammonia aud 200 parts of 30 per cent formaldehyde solution are heated at from 90 to 100° C. until unchanged initial material can no longer be detected. After cooling, the difficultly soluble ammonium compound of the reaction product is filtered off by suction and washed with dilute ammonium chloride solution. By acidification, the free hydroxy compound is obtained which in behavior and composition is identical with the 2-hydroxy-Bz1.Bz3-diazabenzanthrone described in Example 2 of the German specification No. 642,001. It dissolves in concentrated sulfuric acid giving a yellow coloration and in alkalies giving a red coloration.

The same compound is formed by using hexamethylene tetramine instead of formaldehyde. By reacting 1-amino-2-hydroxyanthraquinone with acetaldehyde, phenylacetaldehyde or propionaldehyde, the corresponding derivatives are obtained. With benzaldehyde and its derivatives, the corresponding 2-hydroxy-Bz2-phenyl derivatives are obtained.

Other aminohydroxyanthraquinones, as for example 1-amino-2.4-dihydroxyanthraquinone, 1.5-diamino-4-hydroxyanthraquinone and 1.5-diamino-4.8-dihydroxyanthraquinone, react in a similar manner.

Example 10

20 parts of 1-amino-2-hydroxyanthraquinone, 200 parts of 5 per cent ammonia and 25 parts of butyraldehyde are heated at 110° C. until the 1-amino-2-hydroxyanthraquinone has completely reacted. The aqueous solution is then poured off and the residue is washed with water. The residue is freed from excess butyraldehyde by trituration with ether and boiled up with benzene. It consists of the ammonium compound of 2-hydroxy-Bz2-propyl-Bz1.Bz3-diazabenzanthrone. By acidification, the free hydroxy compound is obtained practically pure; it may if desired be obtained analytically pure by recrystallization from organic solvents, as for example benzene or ligroin.

*Example 11*

20 parts of 1-amino-2-hydroxyanthraquinone, 350 parts of about 4 per cent ammonia, 20 parts of hexoic aldehyde and 20 parts of meta-nitrobenzene sulfonic acid sodium salt are heated in a closed vessel at 110° C. until unchanged initial material can no longer be detected. The whole is worked up as usual and after acidification there is obtained 2-hydroxy-Bz2-pentyl-Bz1.Bz3-diazabenzanthrone. The product is practically pure and may if desired be recrystallized from organic solvents, such as ligroin.

In the same way 2-hydroxy-Bz2-hexyl-Bz1.Bz3-diazabenzanthrone is obtained from 1-amino-2-hydroxyanthraquinone and heptoic aldehyde.

*Example 12*

20 parts of 1-amino-2-hydroxyanthraquinone, 300 parts of pyridine, 50 parts of 30 per cent ammonia, 30 parts of hexamethylene tetramine 20 parts of meta-nitrobenzene sulfonic acid sodium salt are heated at from 90 to 100° C. until unchanged initial material can no longer be detected. The residue is then filtered off by suction, washed with a little pyridine and water and dried. By acidifying the resulting powder, the compound described in Example 9 is obtained.

*Example 13*

20 parts of 1-amino-2-hydroxyanthraquinone, 300 parts of ethyl alcohol, 50 parts of 30 per cent ammonia, 30 parts of hexamethylene tetramine and 20 parts of meta-nitrobenzene sulfonic acid sodium salt are heated at from 90 to 100° C. until initial material can no longer be detected. After cooling, the whole is filtered by suction and the residue washed with alcohol and water. After acidification, the 2-hydroxy-Bz1.Bz3-diazabenzanthrone described in Example 9 is obtained.

*Example 14*

20 parts of 1.4-diamino-2-methoxyanthraquinone, 400 parts of 7.5 per cent ammonia, 100 parts of 30 per cent formaldehyde solution and 30 parts of meta-nitrobenzene sulphonic acid sodium salt are heated at 105° C. until unchanged initial material can no longer be detected. After cooling, the residue is filtered off by suction and washed with water. It consists of 4-amino-beta-methoxy-Bz1.Bz3-diazabenzanthrone which dissolves in concentrated sulfuric acid giving a red coloration and dyes acetate artificial silk yellow shades with a green fluorescence.

*Example 15*

20 parts of 1-amino-2-hydroxyanthraquinone, 300 parts of 10 per cent ammonia, 30 parts of benzaldehyde-ortho-sulfonic acid and 20 parts of meta-nitrobenzene sulfonic acid sodium salt are heated at from 90 to 100° C. until unchanged initial material can no longer be detected. Common salt is added and the resulting sodium compound filtered off by suction. By acidification, there is obtained therefrom the free 2-hydroxy-Bz2-phenyl-Bz1.Bz3-diazabenzanthrone-2'-sulfonic acid which dyes wool orange shades.

Analogous compounds are obtained by using other benzaldehyde sulfonic acids, as for example benzaldehyde meta-sulfonic acid, benzaldehyde-2.4-disulfonic acid or benzaldehyde-4-chlor-2-sulfonic acid.

*Example 16*

20 parts of 1-amino-2-hydroxyanthraquinone, 250 parts of 5 per cent ammonia, 20 parts of benzaldehyde-orthocarboxylic acid and 30 parts of meta-nitrobenzene sulfonic acid sodium salt are heated at from 90 to 100° C. until unchanged initial material can no longer be detected. The sodium compound formed is precipitated by adding common salt, filtered off by suction and washed with common salt solution. By acidification the free acid is obtained which according to its behavior is 2-hydroxy-Bz2-phenyl-Bz1.Bz3-diazabenzanthrone - 2' - carboxylic acid. It dyes wool yellow shades from an acid bath.

Other benzaldehyde carboxylic acids, as for example benzaldehyde-para-carboxylic acid, react in the same way.

*Example 17*

20 parts of 1-aminoanthraquinone-2-sulfonic acid are heated at from 90 to 100° C. with a mixture of 200 parts of 30 per cent aqueous ammonia, 200 parts of 30 per cent aqueous formaldehyde solution and 15 parts of meta-nitrobenzene sulfonic acid sodium salt until initial material can no longer be detected. Saturated common salt solution is then stirred in and the whole allowed to cool. The deposited sodium compound is filtered off by suction and washed with common salt solution. The compound obtainable therefrom by acidification is, according to its properties, Bz1.Bz3-diazabenzanthrone-2-sulfonic acid.

*Example 18*

20 parts of 1-aminoanthraquinone-2-sulfonic acid, 200 parts of 30 per cent ammonia, 200 parts of 30 per cent formaldehyde solution and 1 part of ammonium vanadate is heated at from 90 to 100° C. while leading air through until unchanged initial material can no longer be detected. Saturated common salt solution is then stirred in, the whole allowed to cool and the sodium compound formed is filtered off by suction. By acidification of the sodium compound, a compound is obtained which according to its properties is Bz1.Bz3-diazabenzanthrone-2-sulfonic acid.

*Example 19*

20 parts of 1-aminoanthraquinone-2-sulfonic acid are slowly heated to from 90 to 100° C. with a mixture of 200 parts of 30 per cent aqueous ammonia and 200 parts of 30 per cent aqueous formaldehyde solution. After a short time crystals commence to separate; these, according to their properties and analysis, are Bz1.Bz3-diazabenzanthrone.

If the same reaction be carried out with only 20 parts of 30 per cent formaldehyde solution, but under pressure, a mixture of Bz1.Bz3-diazabenzanthrone and 2-amino-Bz1.Bz3-diazabenzanthrone is obtained.

*Example 20*

10 parts of 1.51-diaminoanthraquinone-2-sulfonic acid are heated to from 90 to 100 C. with a mixture of 250 parts of about 6 per cent aqueous ammonia, 10 parts of hexamethylene tetramine and 7.5 parts of meta-nitrobenzene sulfonic acid sodium salt until unchanged initial material can no longer be detected. After adding saturated common salt solution and cooling, the sodium salt is filtered off by suction. By acidifying the sodium salt, a sulfonic acid is obtained which according to its properties is 1.3.7.9-tetrazaperylene-4-sulfonic acid.

From 1.4-diaminoanthraquinone-2-sulfonic acid there is formed 4-amino-Bz1.Bz3-diazabenzanthrone-2-sulfonic acid which dissolves in concentrated sulfuric acid giving a yellow-red coloration and yields yellow dyeings on wool.

*Example 21*

20 parts of 1-amino-4-anilinoanthraquinone-2-sulfonic acid, 500 parts of 5 per cent ammonia, 40 parts of hexamethylene tetramine and 30 parts of meta-nitrobenzene sulfonic acid sodium salt are heated at from 90 to 100° C. until unchanged initial material can no longer be detected. Common salt solution is then stirred in and the sodium salt of 4-anilino-Bz1.Bz3-diazabenzanthrone-2-sulfonic acid filtered off by suction and washed with common salt solution. The compound dyes wool fast red shades from an acid bath.

By the reaction of 1-amino-4-para-toluidinoanthraquinone-2-sulfonic acid, the corresponding 4-para-toluidino compound is obtained which dyes wool fast bluish red shades from an acid bath.

The reaction proceeds in the same way when using other aldehydes, as for example acetaldehyde, or propionaldehyde. When using other 1-amino-4-alkyl- or -arylaminoanthraquinone-2-sulfonic acids, products having similar properties are obtained.

*Example 22*

20 parts of 1-aminoanthraquinone-2-sulfonic acid, 250 parts of 5 per cent aqueous ammonia, 20 parts of salicyl aldehyde and 20 parts of meta-nitrobenzene sulfonic acid sodium salt are heated at from 90 to 100° C. until unchanged initial material can no longer be detected. The whole is precipitated with common salt solution, filtered by suction and washed with common salt solution. By acidification there is obtained the free sulfonic acid which according to its properties is Bz2-(2'-hydroxy)-phenyl-Bz1.Bz3-diazabenzathrone-2-sulfonic acid. It dyes wool yellow shades.

*Example 23*

100 parts of 1-aminoanthraquinone-2-carboxylic acid, 100 parts of 30 per cent ammonia and 250 parts of 30 per cent formaldehyde solution are heated at from 90 to 100° C. until dissolution and change of color from red to red-yellow have taken place. From the resulting solution there is precipitated by the addition of common salt a sodium salt which is filtered off and washed with common salt solution. By acidifying the sodium salt, a free acid is obtained which dissolves in concentrated sulfuric acid giving a pale yellow coloration and in alkali hydroxide solutions giving colorless solutions and which according to its properties and analysis is Bz1.Bz3-diazabenzanthrone-2-carboxylic acid. The melting point of the new acid is from 272 to 273° C.

If the 1-aminoanthraquinone-2-carboxylic acid be reacted with hexamethylene tetramine in dilute aqueous ammonia instead of with ammonia and formaldehyde, the same compound is obtained. In the same way, starting from 1-aminoanthraquinone-3- or -6-carboxylic acid, the corresponding Bz1.Bz3-diazabenzanthrone-3- or -6-carboxylic acids are obtained.

*Example 24*

18 parts of paraformaldehyde are added to a solution of 100 parts of 1-aminoanthraquinone-2-carboxylic acid in 1000 parts of 96 per cent sulfuric acid, the whole being stirred for half an hour at room temperature. The whole is then poured into ice-water, filtered by suction and washed until neutral.

The product thus obtained is gradually heated to 90° C. with about 15 parts of aqueous ammonia and stirred at the said temperature until dissolution takes place. Any residue present is filtered off by suction and to the filtrate diluted with water, sodium carbonate solution is added until precipitation takes place. The precipitated sodium salt is filtered off by suction and washed with dilute sodium carbonate solution. By acidifying the sodium salt, the free acid is obtained which is identical with the Bz1.Bz3-diazabenzanthrone-2-carboxylic acid described in Example 23 and which may be well purified by recrystallization from pyridine or nitrobenzene or by way of its nitrate.

By treating 1-amino-4-nitroanthraquinone-2-carboxylic acid in a similar way first with formaldehyde and then with ammonia, the 4-amino-Bz1.Bz3-diazabenzanthrone-2-carboxylic acid described in the third paragraph of Example 23 is obtained.

*Example 25*

20 parts of 1-amino-4-hydroxyanthraquinone-2-carboxylic acid are heated at from 90 to 100° C. with a mixture of 1000 parts of 3 per cent aqueous ammonia, 30 parts of hexamethylene tetramine and 30 parts of meta-nitrobenzene sulfonic acid sodium salt until initial material is no longer detectable. 150 parts of solid common salt are then stirred in and the deposited sodium salt is filtered off by suction. By acidification there is obtained therefrom a product which dissolves in concentrated sulfuric acid giving an orange coloration and in alkalies giving a red coloration and which according to its properties is 4-hydroxy-Bz1.Bz3-diazobenzanthrone-2-carboxylic acid.

*Example 26*

10 parts of 5-aminobenzanthrone, 300 parts of 30 per cent ammonia, 50 parts of 30 per cent formaldehyde solution and 7.5 parts of meta-nitrobenzene sulfonic acid sodium salt are heated for 10 hours at 105° C. After cooling, the whole is filtered by suction, washed until neutral and dried. The product obtained is identical in its properties with the diazaperylene described in the Example 1 of specification No. 479,407.

If 4-aminobenzanthrone be reacted in a similar way, a diazabenzopyrene is obtained which dissolves in concentrated sulfuric acid giving a yellow-red coloration and a strong green-yellow fluorescence and which is also identical in its other properties with the 6.7-benzo-8.10-diazapyrene described in Example 3 of the said specification No. 479,407. Products having similar properties are obtained by using 4- or 5-amino-1.9-pyrazol- or -thiazolanthrone.

*Example 27*

20 parts of 1-amino-5-benzoylaminoanthraquinone, 300 parts of 30 per cent ammonia, 100 parts of 30 per cent formaldehyde solution and 30 parts of meta-nitrobenzene sulfonic acid sodium salt are heated at 150° C. until unchanged initial material can no longer be detected. After cooling, the reaction product is filtered off by suction, freed from mother liquor by washing with water and dried. It dissolves in concentrated sulfuric acid giving an orange coloration and dyes cotton yellow shades from a brownish vat. According to its properties it is identical with the dyestuff described in Example 3 of the specification No. 385,295.

Example 28

Into a mixture of 100 parts of nitrobenzene and 25 parts of benzaldehyde there are introduced, while leading in ammonia at 125° C., 22.3 parts of 1-aminoanthraquinone and the said temperature is maintained until 1-aminoanthraquinone can no longer be detected. Yellow crystals separate; these are filtered off by suction and freed from adherent nitrobenzene and benzaldehyde by washing with benzene and alcohol or by steam distillation. There is thus obtained an excellent yield, in a good state of purity of Bz.2-phenyl-Bz1.Bz3-diazabenzanthrone which dissolves in sulfuric acid giving a yellow coloration and crystallizes from nitrobenzene in yellow needles.

By using methyl-, halogen- or alkoxy-benzaldehydes instead of benzaldehyde, the corresponding methyl, halogen or alkoxy derivatives are obtained.

Example 29

34.2 parts of 1-amino-4-benzoylaminoanthraquinone are introduced into a solution of 25 parts of benzaldehyde in 200 parts of nitrobenzene while leading in ammonia at from 130 to 140° C., the mixture being heated until unchanged initial material can no longer be detected. It is filtered by suction while hot and washed free from nitrobenzene. Orange colored crystals are thus obtained in a good yield; according to analysis and their properties they are pure 4-benzoylamino-Bz2-phenyl - Bz1.Bz3 - diazabenzanthrone. They dissolve in concentrated sulfuric acid giving a red-yellow coloration and dye cotton clear yellow shades from a red vat.

By dissolving 10 parts of the resulting dyestuff in 10 times the amount of sulfuric acid and then diluting with water at from 70 to 80° C., red crystals are precipitated. After filtration by suction and washing, pure 4-amino-Bz2-phenyl-Bz1.Bz3-diazabenzanthrone is obtained.

Example 30

23.7 parts of 1-amino-2-methylanthraquinone are introduced into a solution of 25 parts of benzaldehyde in 150 parts of nitrobenzene. Into this suspension ammonia is led at from 130 to 140° C. until unchanged initial material can no longer be detected. After working up in the usual way, practically pure 2-methyl-Bz2-phenyl-Bz1.Bz3-diazabenzanthrone is obtained; after recrystallization from nitrobenzene it is obtained in the form of pale yellow crystals.

By using para-methoxybenzaldehyde instead of benzaldehyde, the corresponding methoxy derivative is obtained. Instead of nitrobenzene, orthodichlorbenzene may also be used.

Example 31

34.2 parts of 1-amino-5-benzoylaminoanthraquinone in 200 parts of nitrobenzene are treated with 25 parts of benzaldehyde and ammonia as described in Example 29. Almost pure, crystallized 5-benzoylamino-Bz2-phenyl-Bz1.Bz3-diazabenzanthrone is obtained which dyes cotton clear, powerful golden-yellow shades from a red vat.

By using para-dimethylaminobenzaldehyde instead of benzaldehyde, the corresponding Bz2-para-dimethylaminophenyl product is obtained in crystals having a metallic lustre.

Example 32

17 parts of 1-amino-4-benzoylaminoanthraquinone in 200 parts of nitrobenzene are heated with 25 parts of hexamethylene tetramine while leading in ammonia at from 170 to 180° C. until unchanged initial material can no longer be detected. After cooling, the product is filtered off by suction and washed in the usual manner. A product is obtained which dissolves in concentrated sulfuric acid giving a yellow coloration and which yields clear greenish yellow dyeings on vegetable fibres from a red vat. For the purpose of purification it may if desired be recrystallized from nitrobenzene or sublimed in a high vacuum. The dyestuff is identical in its properties with the product described in Example 1 of the specification No. 385,295.

By using 1-amino-5-benzoylaminoanthraquinone, the corresponding 5-benzoylamino derivative is obtained which is identical with the product described in Example 3 of the German specification No. 633,207.

Example 33

23.8 parts of 1.4-diaminoanthraquinone in 125 parts of nitrobenzene are heated at from 125 to 130° C. with 20 parts of benzaldehyde while leading in ammonia until unchanged initial material can no longer be detected. After working up in the usual way, 4-amino-Bz2-phenyl-Bz1.Bz3-diazabenzanthrone is obtained in a pure crystalline form. Instead of nitrobenzene, halogenbenzenes or naphthalene may be used.

Example 34

25.3 parts of 1.4-diamino-2-methoxyanthraquinone in 125 parts of nitrobenzene are treated with 25 parts of benzaldehyde at from 130 to 140° C. while leading in gaseous ammonia until unchanged initial material can no longer be detected. The whole is worked up as usual and there are obtained red-yellow crystals which according to their chemical and tinctorial properties are 4-amino-beta-methoxy - Bz2 - phenyl - Bz1.Bz3-diazabenzanthrone and which dissolve in concentrated sulfuric acid giving a yellow-red coloration. The solution becomes colored bluish red upon the addition of para-formaldehyde.

By using 1-amino-2-methoxyanthraquinone, a product is obtained which according to its behavior is 2-methoxy-Bz2-phenyl-Bz1.Bz3-diazabenzanthrone.

Example 35

40 parts of 1-amino-2-brom-4-para-toluidinoanthraquinone in 250 parts of nitrobenzene are heated at about 140° C. with 50 parts of benzaldehyde while leading in ammonia until unchanged initial material can no longer be detected. After working up in the usual manner, the reaction product is obtained in the form of red crystals.

Example 36

50 parts of 1-aminoanthraquinone-2-aldehyde in 500 parts of nitrobenzene are heated at from 130 to 150° C. while leading in ammonia until red-violet needles have been formed. The whole is filtered by suction at 100° C. and the residue freed from nitrobenzene. The reaction product may be recrystallized from nitrobenzene and dissolves in concentrated sulfuric acid giving a yellow coloration. Upon the addition of paraformaldehyde, the color of the solution changes to greenish blue. From a red-violet hydrosulfite vat there are obtained on cotton violet dyeings fast to drops of water and of good fastness properties.

By treating 1-amino-4-nitroanthraquinone-2-aldehyde in nitrobenzene in the same way with ammonia at 150° C., a substance which crystallizes in bluish red needles is obtained which dissolves in concentrated sulfuric acid giving a yellow-red coloration and dyes cotton blue shades from a blue-red vat.

Products of similar properties are obtained by starting from other 1-aminoanthraquinone-2-aldehydes, as for example 1.4-diaminoanthraquinone - 2 - aldehyde or 1-amino-4-hydroxyanthraquinone-2-aldehyde.

Example 37

23.8 parts of 1.5-diaminoanthraquinone in 125 parts of nitrobenzene and 25 parts of benzaldehyde are heated at from 130 to 140° C. while leading in ammonia until unchanged initial material can no longer be detected. The whole is worked up as usual and a crystalline product of orange color is obtained which dissolves in concentrated sulfuric acid giving a reddish yellow coloration and which is obtained in orange colored crystals after recrystallization from nitrobenzene. According to its properties and analysis it is probably diphenyl-tetrazaperylene.

Example 38

19 parts of 1-amino-4-bromanthraquinone-2-sulfonic acid are heated at from 140 to 160° C. in 150 parts of nitrobenzene and 25 parts of benzaldehyde while leading in ammonia until a sample withdrawn and dissolved in sulfuric acid no longer gives the blue coloration of the initial material with paraformaldehyde. After working up in the usual way, an orange colored crystal powder is obtained which dissolves in concentrated sulfuric acid giving a red coloration. The color of the solution changes to blue-red upon the addition of paraformaldehyde. By dissolving in dilute ammonia, a crystalline ammonium salt may be prepared in pure form. According to analysis the product is 4-amino-Bz2-phenyl-Bz1.Bz3-diazabenzanthrone-2-sulfonic acid which dyes wool fast orange shades from an acid bath.

Products of similar composition are obtained by starting from other 1-aminoanthraquinone sulfonic acids, as for example 1-aminoanthraquinone-2-sulfonic acid, 1-amino-4-para-toluidinoanthraquinone-2-sulfonic acid or 1-amino-4-methylaminoanthraquinone-2-sulfonic acid.

Example 39

5 parts of 4-amino-3'.5'-dichloranthraquinone-1-(N).2-2'(N).1-benzacridone in 150 parts of nitrobenzene are heated with 10 parts of benzaldehyde at from 150 to 160° C. while leading in ammonia until the blue crystals of the aminoacridone have disappeared and unitary red needles have been formed which after the usual working up, dissolve in concentrated sulfuric acid giving a wine-red coloration.

Products of similar properties are obtained by treating other 4-aminoanthraquinoneacridones, as for example 4 - amino - 1(N).2 - 2'(N).1' - 5'- chloranthraquinonebenzacridone, 4 - amino - 1(N).2-2'(N).1'-5'-chloranthraquinone-naphth - acridone, 4 - amino - 1(N).2' - 2'(N).1' - anthraquinoneanthraquinoneacridone or 4 - aminoanthraquinone-thioxanthrones in the same way with aldehydes and ammonia.

Example 40

9.8 parts of hexamethylene tetramine and 2.7 parts of 2-amino-3-acetylanthraquinone (prepared from 2-chlor-3-acetylanthraquinone by the exchange of chlorine for the amino group according to the specification No. 440,263) are suspended in 250 parts of nitrobenzene and heated for 3 hours at 120° C. while leading in ammonia. The crystalline reaction product is filtered off by suction while hot, washed with methanol and dried. It dissolves in boiling nitrobenzene and crystallizes therefrom on cooling in orange crystals; it dissolves in concentrated sulfuric acid giving an orange coloration and yields a green vat with alkaline hydrosulfite. According to analysis and its properties it is Bz4-methyl-Bz1.Bz3-diaza-2.3 benzanthraquinone.

By treating 2-amino-3-benzoylanthraquinone (prepared as described in Berichte der Deutschen Chemischen Gesellschaft, vol. 47, pages 566–567) in the same way with hexamethylene tetramine, the corresponding Bz4-phenyl derivative is obtained which dissolves in concentrated sulfuric acid giving a red coloration and yields a green vat with alkaline hydrosulfite.

Example 41

6.1 parts of acetaldehyde-ammonia are suspended in 50 parts of monochlorbenzene and saturated with ammonia at 20° C. 2.7 parts of 2-amino-3-acetylanthraquinone dissolved in 200 parts of nitrobenzene are then added and the whole heated to 110° C. for 2½ hours. Upon cooling, yellowish red crystals separate which are filtered off by section and washed with methanol. The crude product may be purified by crystallization from monochlorbenzene. It dissolves in concentrated sulfuric acid giving a red coloration and yields with alkaline hydrosulfite a green vat. According to its behavior and analysis, it is Bz2.Bz4-dimethyl-Bz1.Bz3-diaza-2.3-benzanthraquinone.

The corresponding phenyl derivative, which dissolves in concentrated sulfuric acid giving a red coloration and yields with alkaline hydrosulfite a green vat, is obtained by reacting 2-amino-3-benzoylanthraquinone in the same way.

Example 42

5.8 parts of propionaldehyde are dissolved in 40 parts of monochlorbenzene and ammonia is led in at 20° C. for half an hour. A hot solution of 2.7 parts of 2-amino-3-acetylanthraquinone in 200 parts of nitrobenzene is then added and the whole heated to 120° C. for 3 hours. The condensation product is worked up in the usual manner. It may be recrystallized from nitrobenzene and dissolves in concentrated sulfuric acid giving a red coloration. Its vat is green.

Example 43

7.2 parts of butyraldehyde are dissolved in 40 parts of monochlorbenzene and treated with ammonia for half an hour at 20° C. After adding 3.3 parts of 2-amino-3-benzolanthraquinone in 225 parts of nitrobenzene the whole is heated for 3 hours at 120° C. The crude product is filtered off by suction, washed with methanol and recrystallized from nitrobenzene. It dissolves in concentrated sulfuric acid giving a red coloration; its hydrosulfite vat is green.

By using benzaldehyde instead of butyraldehyde, yellow matted needles are obtained which may be recrystallized from monochlorbenzene. They dissolve in concentrated sulfuric acid giving a greenish yellow coloration.

Example 44

13.6 parts of anisaldehyde are dissolved in 75 parts of dichlorbenzene and treated for half an hour at 20° C. with ammonia. A hot solution of 3.3 parts of 2-amino-3-benzoylanthraquinone in 225 parts of nitrobenzene are then added and the whole heated for 3 hours at 120° C. The condensation product which separates in yellow crystals is filtered off by suction at from 50° to 60° C., washed with methanol and recrystallized from monochlorbenzene. It dissolves in concentrated sulfuric acid giving an orange coloration. According to analysis and its properties it is Bz2-(4'-methoxy)-phenyl-Bz4-phenyl-Bz1.Bz3-diaza-2.3-benzanthraquinone.

Example 45

6.8 parts of 1-amino-4-benzoylaminoanthraquinone are heated in 100 parts of nitrobenzene at from 140 to 150° C. while leading in ammonia. After adding 6 parts of 1-naphthaldehyde, the whole is kept at the said temperature until unchanged initial material can no longer be detected, and the reaction product separates in the form of yellow crystals. These are filtered off by suction and freed from nitrobenzene. The resulting product dissolves in concentrated sulfuric acid giving a red-yellow coloration and yields reddish yellow dyeings on cotton from a red vat.

By using anthraquinone-2-aldehyde instead of 1-naphthaldehyde, a product of similar properties is obtained.

In the same way there is obtained from 1-aminoanthraquinone and benzanthrone-2-aldehyde a yellow powder which dissolves in concentrated sulfuric acid giving a yellow-red coloration.

Example 46

25 parts of benzaldehyde in 200 parts of nitrobenzene are heated, after the addition of 7.5 parts of 4.4'-diamino-1.1'-dianthraquinonylamine, at from 140° to 150° C. while leading in ammonia until unchanged initial material can no longer be detected. After working up, red-violet crystals are obtained which dissolve in concentrated sulfuric acid giving a green coloration. The color of the solution does not change upon the addition of paraformaldehyde.

Example 47

5 parts of 1.4-diamino-2-anthraquinonyl-2'.3'-anthraquinone-thiazole (prepared for example according to Example 7 of British specification No. 436,951) are heated at from 140 to 150° C. with 50 parts of para-chlorbenzaldehyde and 100 parts of nitrobenzene while leading in ammonia until the green-blue crystals of the initial material have almost disappeared. After filtration by suction, a violet crystalline powder is obtained which dissolves in concentrated sulfuric acid giving no longer the yellow coloration of the initial material but a blue-red coloration; it dyes cotton reddish blue shades from a red-violet vat.

A product of similar properties is obtained by using other amino-2-anthraquinonylanthraquinonethiazoles or -oxazoles, as for example 1.4-diamino-2-anthraquinonyl-2'.3'-anthraquinoneoxazole.

Example 48

A mixture of 10 parts of 5-amino-Py-C.3-carbethoxy-1.9-anthrapyridone (prepared by saponifying the corresponding 5-benzoyl compound obtained according to Example 1 of the German Patent 655,650 with hot dilute sulfuric acid), 200 parts of a 30 per cent aqueous solution of ammonia, 75 parts of a 30 per cent aqueous solution of formaldehyde and 20 parts of the sodium salt of meta-nitrobenzene sulfonic acid is heated while stirring at 110° C. until initial material is no longer detectable. After cooling, the deposited compound is filtered off by suction, washed with water and dried. It dissolves in concentrated sulfuric acid, giving a yellow coloration which does not change after addition of paraformaldehyde.

Example 49

A mixture of 10 parts of 4-amino-Py-C.3-carbethoxy-1.9-anthrapyridone (prepared by saponifying the corresponding 4-benzoyl compound obtained according to the process described in the German Patent 655,650) with hot dilute sulfuric acid, 200 parts of a 30 per cent aqueous solution of ammonia, 75 parts of a 30 per cent aqueous solution of formaldehyde and 20 parts of the sodium salt of the meta-nitrobenzene sulfonic acid is heated at 120° C. while stirring until initial material is no longer detectable. By acidifying the reaction mixture a yellow precipitate is obtained which is filtered off by suction, washed with water until neutral and dried.

The new compound dissolves in concentrated sulfuric acid, giving an orange coloration which does not change after addition of formaldehyde.

Example 50

5 parts of benzaldehyde are introduced at 125° C. while stirring into a mixture of 5 parts of 5-amino-Py-C.3-carbethoxy-1.9-anthrapyridone (prepared as described in Example 48), and 50 parts of nitrobenzene and ammonia is led through the mixture until initial material is no longer detectable. After cooling to about 80° C. the deposited compound is filtered off by suction, washed with nitrobenzene and methanol and dried. A yellow crystal powder is thus obtained which dissolves in concentrated sulfuric acid giving an orange coloration which does not change after addition of formaldehyde.

Example 51

6 parts of benzaldehyde are introduced at 140° C. while stirring into a mixture of 6 parts of 5-amino-1.9-(Py-C-phenyl)-anthrapyridazine (prepared according to the process described in Swiss Patent 194,341) and 100 parts of nitrobenzene and ammonia is led through the mixture until initial material is no longer detectable. After cooling the separated yellow needles are filtered off by suction, washed with nitrobenzene and methanol and dried. The new compound dissolves in concentrated sulfuric acid giving a yellow-red coloration which does not change after addition of paraformaldehyde whereas the yellow solution of the starting material becomes blue after addition of paraformaldehyde.

Example 52

A mixture of 10 parts of 1-amino-2-hydroxyanthraquinone, 200 parts of water, 30 parts of a 30 per cent aqueous solution of ammonia, 10 parts of furfurol and 10 parts of the sodium salt of the meta-nitrobenzene sulfonic acid is heated at from 90 to 95° C. while stirring until the starting material has disappeared. After cooling, the separated in water difficultly soluble ammonium salt of the final product is filtered off by suction and washed with cold water. By acidifying the ammonium salt the free hydroxy compound is obtained which may be purified by recrystallization from organic solvents, such as nitrobenzene or pyridine or by dissolving it in concentrated sulfuric acid and precipitating it in steps by addition of water.

Example 53

A mixture of 10 parts of 5-amino-1.9-anthrapyrimidone (prepared by saponifying the 5-benzoylamino-1.9-anthrapyrimidone), 200 parts of a 30 per cent aqueous solution of ammonia, 75 parts of a 30 per cent aqueous solution of formaldehyde and 20 parts of the sodium salt of the meta-nitrobenzene sulfonic acid is heated at 110° C. while stirring until initial material is no longer detectable. After cooling the separated compound is filtered off by suction, washed with water until neutral and dried. It dissolves in concentrated sulfuric acid giving an orange coloration which does not change after addition of formaldehyde. It may be purified by recrystallization from organic solvents or dissolving it in concentrated sulfuric acid and precipitating it in steps by addition of water.

Example 54

20 parts of acetaldehyde are allowed to drop within an hour at 95° C. into a mixture of 44 parts of 1.5-diaminoanthraquinone-2-sulfonic acid, 1000 parts of water, 80 parts of a 30 per cent aqueous solution of ammonia and 20 parts of the sodium salt of the meta-nitrobenzene sulfonic acid and the mixture is stirred at 95° C. until the starting material has disappeared. The reaction mixture is then acidified with dilute sulfuric acid, the precipitate filtered off by suction, washed until neutral and dried. The 5-amino-Bz2-methyl-Bz1.Bz3-diazabenzanthrone-2-sulfonic acid thus obtained dissolves in concentrated sulfuric acid giving a yellow coloration which turns to blue after addition of formaldehyde.

Example 55

Into a solution of 40 parts of 1-aminoanthraquinone-2-carboxylic acid in 1000 parts of water and 40 parts of a 30 per cent aqueous solution of ammonia there are introduced 32 parts of benzaldehyde-ortho-carboxylic acid and 24 parts of the sodium salt of the meta-nitrobenzene sulfonic acid and the whole is heated at 95° C. while stirring until the red color of the solution has changed to orange. Sodium chloride is then added to the solution until the final product has separated as sodium salt in a crystalline form. By acidifying the free Bz2-phenyl-Bz1.Bz3-diazabenzanthrone-2.2'-dicarboxylic acid having the following formula

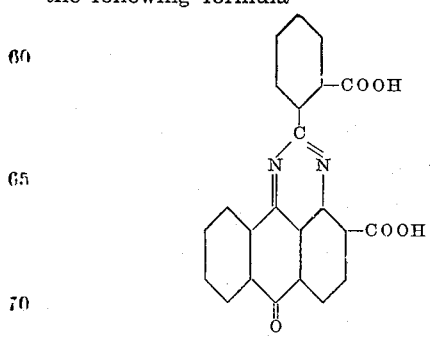

is obtained. It dissolves in concentrated sulphuric acid giving a yellow coloration and in dilute alkali hydroxides giving an orange coloration.

If benzaldehyde-meta-carboxylic acid or benzaldehyde-para-carboxylic acid is employed instead of the benzaldehyde-ortho-carboxylic acid the corresponding 2.3'- and 2'.4'-dicarboxylic acid respectively are obtained having similar properties. The dicarboxylic acids may be precipitated from their solution in concentrated sulfuric acid by addition of water in form of their well crystallized sulfates.

Example 56

A mixture of 32 parts of 1-amino-2-phenyl-azomethine-C-anthraquinone and 200 parts of nitrobenzene is heated at 125° C. while stirring and after addition of 20 parts of benzaldehyde ammonia is led through the mixture until the blue-red crystals of the starting material are no longer detectable. The whole is then filtered off by suction while hot and the filtrate is allowed to cool. The yellow reaction product depositing from the filtrate is filtered off by suction, washed with nitrobenzene and methanol and dried. By recrystallization from nitrobenzene the new compound is obtained in form of yellow crystals which dissolve in concentrated sulfuric acid giving a reddish yellow coloration which does not change after addition of paraformaldehyde.

Example 57

A mixture of 100 parts of 1-amino-4-nitro-anthraquinone-2-carboxylic acid, 2000 parts of water, 100 parts of a 30 per cent aqueous solution of ammonia, 70 parts of a 30 per cent aqueous solution of formaldehyde and 60 parts of the sodium salt of the meta-nitrobenzene sulfonic acid is heated at from 90 to 100° C. for about 2 hours while stirring. After acidifying the reaction mixture the deposited compound is filtered off by suction, washed with hot water until neutral and dried. The 4-amino-Bz1.Bz3-diazabenzanthrone-2-carboxylic acid thus obtained may be purified by recrystallizing it from organic solvents, such as pyridine or nitrobenzene, or by means of its alkali salts or by means of its sulfates. The coloration of the solution in concentrated sulfuric acid is red.

By using acetaldehyde instead of formaldehyde the 4-amino-Bz2-methyl-Bz1.Bz3-diazabenzanthrone-2-carboxylic acid is obtained.

Example 58

A mixture of 500 parts of 1-aminoanthraquinone-2-carboxylic acid and 20,000 parts of water, 800 parts of a 30 percent aqueous solution of ammonia, 160 parts of acetaldehyde and 170 parts of the sodium salt of the meta-nitrobenzene-sulfonic acid is heated at from 90 to 95° C. for half an hour while stirring. The reaction mixture is then acidified, the precipitated compound filtered off by suction and washed with hot water until neutral. The Bz2-methyl-Bz1.Bz3-diazabenzanthrone-2-carboxylic acid thus obtained may be purified by recrystallizing it from organic solvents or by means of its alkali salt or by means of its sulfate. It dissolves in concentrated sulfuric acid giving a pale yellow coloration and in alkali hydroxide solution giving colorless solutions.

What we claim is:

1. A process of producing diaza compounds of the anthraquinone series which comprises heating cyclic compounds having at least three condensed rings and the grouping

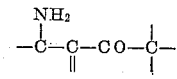

selected from the class consisting of α-amino compounds of the anthraquinone series, o-amino-alkyl ketones of the anthraquinone series and o-amino-arylketones of the anthraquinone series, with ammonia and aldehydes.

2. A process of producing diaza compounds of the anthraquinone series which comprises heating cyclic compounds having at least three condensed rings and the grouping $$-\overset{NH_2}{\underset{|}{C}}-\underset{\|}{C}-CO-\underset{|}{C}-$$

selected from the class consisting of α-amino compounds of the anthraquinone series, o-amino-alkyl ketones of the anthraquinone series and o-amino-arylketones of the anthraquinone series, with ammonia and aldehydes in the presence of an inert diluent.

3. A process of producing diaza compounds of the anthraquinone series which comprises heating cyclic compounds having at least three condensed rings and the grouping $$-\overset{NH_2}{\underset{|}{C}}-\underset{\|}{C}-CO-\underset{|}{C}-$$

selected from the class consisting of α-amino compounds of the anthraquinone series, o-amino-alkyl-ketones of the anthraquinone series and o-amino-aryl-ketones of the anthraquinone series, with ammonia and aldehydes in the presence of water.

4. A process of producing diaza compounds of the anthraquinone series which comprises heating cyclic compounds having at least three condensed rings and the grouping $$-\overset{NH_2}{\underset{|}{C}}-\underset{\|}{C}-CO-\underset{|}{C}-$$

selected from the class consisting of α-amino compounds of the anthraquinone series, o-amino-alkyl-ketones of the anthraquinone series and o-amino-aryl-ketones of the anthraquinone series, with ammonia and aldehydes in the presence of an oxidizing agent.

5. A process of producing diaza compounds of the anthraquinone series which comprises heating cyclic compounds having at least three condensed rings and the grouping $$-\overset{NH_2}{\underset{|}{C}}-\underset{\|}{C}-CO-\underset{|}{C}-$$

selected from the class consisting of α-amino compounds of the anthraquinone series, o-amino-alkyl-ketones of the anthraquinone series and o-amino-aryl-ketones of the anthraquinone series, with ammonia and aldehydes in the presence of an alkali salt of the nitrobenzene sulphonic acid as an oxidizing agent.

ERICH BERTHOLD.
WERNER ROHLAND.